Dec. 16, 1924.
M. V. MITCHELL
1,519,212
CHAIN TIGHTENER AND COUPLING
Filed March 30, 1923
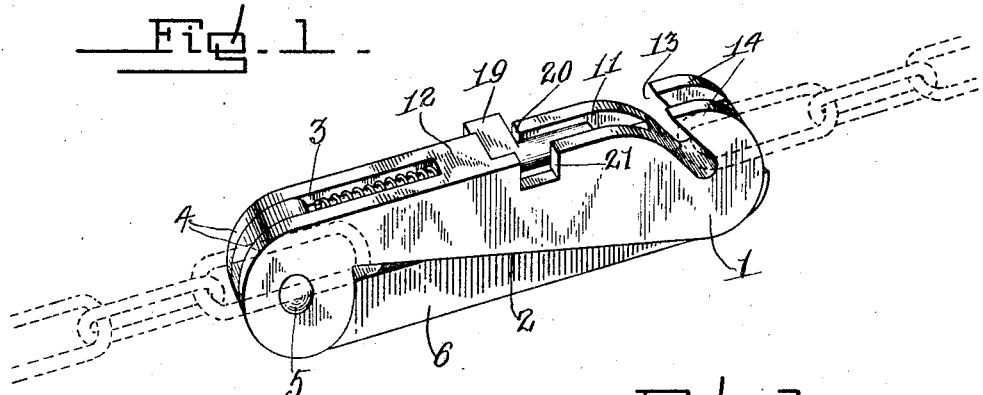
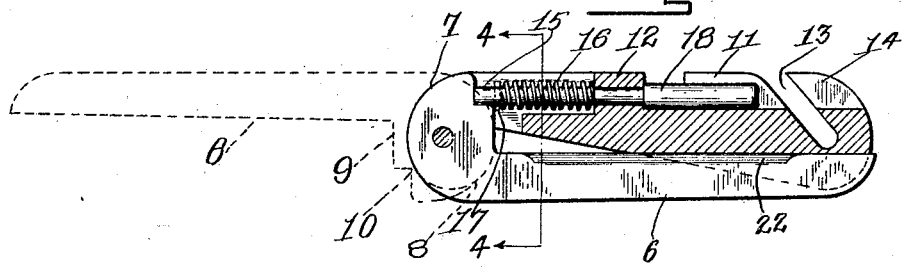
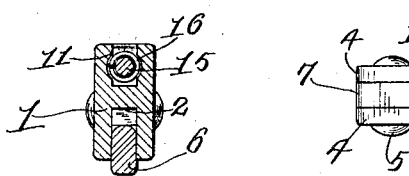
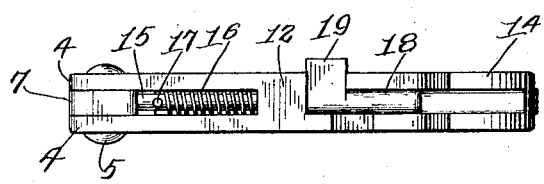
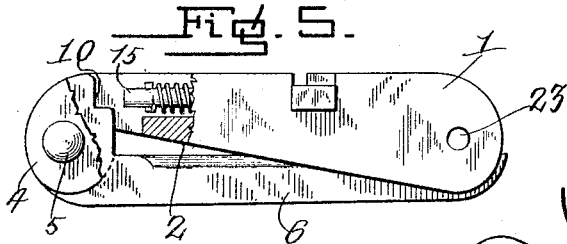
Inventor
M. V. Mitchell Patented Dec. 16, 1924.

1,519,212

UNITED STATES PATENT OFFICE.

MARTIN V. MITCHELL, OF BUTTE, MONTANA.

CHAIN TIGHTENER AND COUPLING.

Application filed March 30, 1923. Serial No. 628,895.

*To all whom it may concern:*

Be it known that I, MARTIN V. MITCHELL, a citizen of the United States, residing at Butte, in the county of Silver Bow and State of Montana, have invented certain new and useful Improvements in a Chain Tightener and Coupling, of which the following is a specification.

This invention relates to new and useful improvements in couplings, and more particularly to a combined tightener and adjustable coupling.

The main object of the present invention is the provision of a combined tightener and coupling which may be used for drawing together the end portions of the side chains of anti-skidding devices, such as are shown in the U. S. patent to Weed No. 781,318, granted January 31, 1905, and for securing the side chains with the cross chains drawn into position over the tire.

Another object of the invention is the provision of a coupling wherein a lever, which is used for drawing the ends of the side chain together, is locked in a closed position for securely holding the ends of the chain against accidental displacement or disconnection.

A further object of the invention is the provision of a combined tightener and coupler, which is simple and compact in construction, so that it may readily be disconnected from the side chain and carried about in a minimum space and at the same time the device can be manufactured, and placed upon the market at a very small cost.

With these and other objects in view, the invention consists in the novel features of construction, the combination and arrangement of parts as pointed out in the claims and shown in the accompanying drawings, in which:

Figure 1 is a perspective view of a combined tightener and coupling constructed in accordance with my invention.

Figure 2 is a longitudinal sectional view through the same.

Figure 3 is a top plan view.

Figure 4 is a transverse section taken on the line 4—4 of Figure 2, and

Figure 5 is a side elevation, illustrating a slightly modified form of the invention, parts of the same being broken away and illustrated in cross section.

Referring now more particularly to the drawings, in which reference characters are used to designate the several parts throughout the views, the numeral 1 indicates an elongated main body portion of my improved device, having one side thereof provided with a recess 2, forming a hook for the accommodation of a cross portion of one link of the side chain.

One end of the body is bifurcated as at 3, to form spaced ears 4, having transverse openings to receive a pivot pin 5 for a lever 6. The lever 6 is provided with an offset pivot head 7, said head having formed upon its outer surface opposite to the lever a cam portion 8, while that portion of the head which extends beyond the longitudinal axis of the lever 6 is provided with wall 9, at a right angle to the said axis, and having a recess 10 formed therein to provide angularly disposed shoulders, the purpose of which will be more fully set forth later.

The side of the body member 1 opposite the recess 2 is provided with a longitudinally extending groove 11, and a transverse wall 12 is extended across the groove 11 intermediate its end to form a stop shoulder. Formed at one end of the body 1 and open at its three sides is a slot 13, said slot preferably extending across the longitudinal groove 11 and forming hook portions 14, which are adapted to be engaged with a chain link, as illustrated in dotted lines in Figure 1. The walls of the slot 13 are disposed in angular relation to the longitudinal axis of body 1, and inclined from the open side toward the end of the body so that the chain link engaged in the slot 13 will be securely retained in position, and such arrangement prevents accidental displacement of the chain link after the chain has been tightened.

The partition 12 is provided with a transverse opening, and movable through the opening is a locking pin 15, the outer end portion of which is adapted to abut against the shoulders formed by the recess 10, when the lever 6 is in its locked position as shown in full lines in Figures 1 and 2. In order to urge the locking pin 15 to its normally protracted position, an expansion coil spring 16 is mounted upon the pin, one end of said spring bearing against the partition 12, and the other end of the spring bearing against a cross pin 17 carried by the locking pin 15. A head 18 is formed upon the end of the pin and disposed upon the opposite side of the partition 12 from the spring 16.

The pin 15 is securely retained against sliding movement after having been moved to its locked position by means of a finger piece 19 carried by head 18, which is adapted to be moved into a recess 20 formed in one of the side walls defined by the longitudinal groove 11. When it is desired to disengage the end of the pin 15 from the recess 10, the finger piece 19 is moved out of recess 20 so as to be slidable in recess 11 and by so sliding the finger piece away from partition 12, the outer end of the pin 15 will be removed from the recess 10; and when moved to an unlocked position, the finger piece 19 may be disposed within a recess 21 formed in the opposite side wall of the groove 11 but in staggered relation to the recess 20.

In using my improved device for attaching or coupling the ends of a side chain, the lever 6 will first be moved outwardly by way of example to the dotted line position in Figure 2 and the link at one end of the chain is engaged over the end of the lever. The lever is then moved inwardly toward the body member 1 and the link will be drawn onto the hook formed by recess 2, so that after the lever has been moved to a closed position parallel with the body portion, the chain link will have its cross portion engaged with the shoulder 9 on the head 7 and also with the inner sides of the ears 4 as illustrated by the dotted lines in Figure 1. When the lever 6 is moved to its locked position, the outer end of the pin 15 will be moved into the recess 10 by the expansion spring 16 so as to retain the lever in its locked position. When the lever is moving to its locked position, however, the end of the pin 15 will ride upon the cam face 8 to allow for free movement of the lever when drawing the chain link toward the body. When the lever 6 is arranged in its locked position as shown in Figure 1, a portion of the end thereof is disposed in, but projects beyond, a longitudinally extending groove 22, formed in body 1, which prevents any lateral movement on the part of the lever when in its locked position. In drawing the two ends of the chain together, it is to be understood that a link of one end portion of the chain is connected with the hook members 14 before the lever 6 is engaged with the chain link on the opposite end of the chain. It is also to be understood that the tightening and coupling device may be separable from the side chain and that the hook members 14 may be engaged in any link at the one end portion of the side chain,—not necessarily the very end link. If there is too much side chain to permit of the same being drawn to the desired tightness by the device, when the very end link of the end portion of the side chain engages the device, then the hook members 14 may be engaged with the next to the last link of one end portion, or so on, avoiding slack in the side chain by selecting that link of one end portion for engagement with the hook members as will permit of the side chain being drawn to the desired tightness by the last link of the other end portion engaged by lever 6 and drawn into recess 2 thereby.

In order to disconnect the ends of the chain, the finger piece 19 is moved out of the recess 20 and by applying pressure to the finger piece, the pin 15 may be moved from the recess 10 in the head of the locking lever. After the pin 15 has been disengaged from the head of the lever, the lever 6 may be moved outwardly away from the body and disposed in the dotted line position as shown in Figure 2, so that the chain link which has been mounted thereon may be readily removed and the entire device disconnected from the ends of the chain. In order to retain the locking pin 15 in an unlocked position, the finger piece 19 will be moved laterally into the recess 21. In Figure 5 I have illustrated a slightly modified form of my invention wherein a transverse opening 23 is formed in one end of the body, in place of slot 13, and in this transverse opening the one end portion of the side chain is permanently connected to the end of the body instead of detachably connected thereto. In this form of the invention the constructions of the remaining parts of the device is the same with the exception of the opening 23 which is used in place of the slot 13 in the preferred form of the invention.

While I have shown and described a preferred and a modified embodiment of my invention, it will be obvious that various changes and alterations may be carried out without departing from the spirit of the invention or the scope of the appended claims.

I claim:

1. A device of the class described including an elongated body member, provided with spaced ears at one end thereof forming a hook, a lever having an offset head at one end pivoted between said ears, said lever being normally disposed longitudinally of the body closing the hook, the head of the lever being provided with a recess, and a latch carried by the body member adapted to be seated within the recess when the lever is in normal position to retain the same against movement.

2. A device for tightening and connecting side chains, comprising an elongated main body adapted for connection at one end portion to one end of the chain and provided with a hook at the other end for the reception of a link of the opposite end of the chain, a longitudinally extending groove open to the face opposite to the mouth of said hook and a pair of recesses in staggered relation in opposite walls of said groove, a lever pivotally connected to said main body adjacent said hook and adapted to be swung to a normal closed position so as to draw a link of the chain into the hook and there retain it, and a latch including a head slidable in said groove and provided with a finger piece adapted to move into either of said recesses, said latch adapted to lock the lever in a normal position when said finger piece is in one of said recesses and to be held retracted when the finger piece is in the other of said recesses so that the lever may swing freely.

MARTIN V. MITCHELL.